UNITED STATES PATENT OFFICE.

GEORGE S. WHITTY, OF NEW YORK, N. Y., ASSIGNOR TO F. W. DEVOE AND C. T. RAYNOLDS COMPANY, OF NEW YORK, N. Y.

STENCILING COMPOUND.

953,110.

No Drawing.

Specification of Letters Patent. Patented Mar. 29, 1910.

Application filed July 27, 1909. Serial No. 509,848.

*To all whom it may concern:*

Be it known that I, GEORGE S. WHITTY, a citizen of the United States, and a resident of the borough of Brooklyn, county of Kings, city and State of New York, have invented a new and Improved Stenciling Compound, which has a marked capacity for being rendered extremely permanent when applied to the material to be stenciled, of which the following is a full, clear, and exact description.

In compounding my material, I use the following ingredients, or their equivalents, in about the following proportions. I take say two per cent. of some suitable direct substantive color. These colors are, for the most part, azo-compounds derived from benzidin, or from bases which are similar to benzidin in their construction. It may beneficially be a coal-tar color, such as benzo fast scarlet. To this I add enough water to thoroughly dissolve the color and hold it in solution. If the water is not naturally sufficiently alkaline to effect the solution, then I make it sufficiently so by suitable addition of agents having an alkaline reaction, such as sodium borate, or any other suitable alkali, or even a neutral soap. I then add about fifteen per cent. of common salt (chlorid of sodium), and about twenty five per cent. of formaldehyde, or any other aldehyde, and finally I add the requisite amount of gummy material, such as gum arabic, dextrin, gum tragacanth, or the like dissolved in water. Some aldehydes are not readily soluble in water. If such be used, I prefer to first dissolve or cut it by the use of alcohol. I sometimes add a suitable percentage of glycerin, which, owing to its hydroscopic quality, will keep the material always moist or fluid.

I prepare my stenciling compound for the market either in the form of a paste, in which case it may be marketed in tubes, to be additionally dissolved or thinned with water at the time of use; or in liquid form, put up in bottles, or other suitable receptacles.

My new compound is applied to the desired surface as by a stenciling plate, with a pen or with a brush. Of course the material will be prepared for the intended use either as a paste, a semi-paste or a liquid. After it has been applied to the desired surface and dried, a wet or damp cloth is applied to the reverse side of the fabric or surface, and the work is then thoroughly steamed by ironing with a hot iron. The work is then allowed to thoroughly dry, when the excess of the stenciling compound, that is to say, that which has not been taken up by the fabric, but rests upon the surface thereof, may be removed by washing. Upon final drying, the work will be found to be soft and pliable.

In order that my invention may be better understood, I will state that in making my new compound, I use the direct substantive colors referred to, because I have found that they work more efficiently than other coloring materials in conjunction with vegetable fiber, such as linen, cotton, etc., and my invention is intended for use in conjunction with fabrics made from such fiber. I use formaldehyde, or other aldehyde, because it aids, when subjected to the heat and steam of the ironing process, in conjunction with the salt, in rendering the colors more fixed than they would otherwise be, particularly since it prevents, or at least largely retards the capillary action of the fibers which would tend to spread or disperse the stenciling material or ink from the immediate lines in which it was in the first instance applied. I use the salt because as soon as the heat and steam of the ironing process are applied, the salt dissolves and combining with the other elements, particularly the formaldehyde, produces an insoluble precipitate on the fabric, which thereafter cannot be removed by washing. The gummy or adhesive material is employed as a means to cause the stenciling compound to adhere to the surface of the fabric when the latter is reversed during the steaming operation, because if it had become dry, it might, during the flexure of the fabric, drop off in part at least. The glycerin, as above stated, if used, is added simply because of its hygroscopic qualities, since it prevents the paste or liquid compound from evaporating or drying up.

I refer to washing away any excess of the stenciling compound after it has been rendered insoluble by the heat and steam of the ironing process, because there is apt to remain upon the surface of the fabric a deposit composed of the residual of the adhesive material and possibly some refuse of the salt, and in order that the character of the fabric may not be changed and its natural softness and smoothness preserved, it is desirable to remove this deposit if it occurs.

Although I prefer the proportions of the ingredients to be substantially as set forth above, yet they may be somewhat departed from and still satisfactory results secured; particularly the amount of the aldehyde may vary considerably, all the way from ten to forty per cent. being usable, depending on the special kind employed.

I claim:

1. A stenciling compound composed of direct substantive coloring matter, an aldehyde, salt and adhesive material.

2. A stenciling compound composed of direct substantive coloring matter, an aldehyde, salt, glycerin, and adhesive material.

In testimony whereof I have signed my name to this specification in the presence of two subscribing witnesses.

GEORGE S. WHITTY.

Witnesses:
PHILLIPS ABBOTT,
J. J. KENNEDY.